(12) United States Patent
Kuzmenko

(10) Patent No.: US 12,430,384 B1
(45) Date of Patent: Sep. 30, 2025

(54) DATA RETRIEVAL AND DISPLAY WITH GROUPED CONTEXT-BASED CATEGORIZATION IN RESPONSE TO CONTEXTLESS KEYWORD QUERIES

(71) Applicant: Alexey V. Kuzmenko, Kirkland, WA (US)

(72) Inventor: Alexey V. Kuzmenko, Kirkland, WA (US)

( * ) Notice: Subject to any disclaimer, the term of this patent is extended or adjusted under 35 U.S.C. 154(b) by 144 days.

(21) Appl. No.: 18/119,595

(22) Filed: Mar. 9, 2023

Related U.S. Application Data

(60) Provisional application No. 63/319,327, filed on Mar. 13, 2022.

(51) Int. Cl.
| | |
|---|---|
| *H04L 29/00* | (2006.01) |
| *G06F 16/732* | (2019.01) |
| *G06F 16/735* | (2019.01) |
| *G06F 16/738* | (2019.01) |
| *G06F 16/74* | (2019.01) |
| *G06F 16/78* | (2019.01) |

(52) U.S. Cl.
CPC .......... *G06F 16/743* (2019.01); *G06F 16/732* (2019.01); *G06F 16/735* (2019.01); *G06F 16/738* (2019.01); *G06F 16/7867* (2019.01)

(58) Field of Classification Search
None
See application file for complete search history.

(56) References Cited

U.S. PATENT DOCUMENTS

| | | | |
|---|---|---|---|
| 9,449,080 B1* | 9/2016 | Zhang | G06F 16/3346 |
| 2009/0106238 A1* | 4/2009 | Lita | G16H 10/60 |
| | | | 707/999.005 |
| 2013/0326353 A1* | 12/2013 | Singhal | G06F 16/683 |
| | | | 715/728 |
| 2014/0013200 A1 | 1/2014 | White | G06F 17/00 |
| 2014/0325557 A1 | 10/2014 | Evans et al. | H04N 21/4788 |
| 2015/0169710 A1 | 6/2015 | Xu et al. | G06F 17/30 |
| 2015/0245097 A1 | 8/2015 | Agrawal | H04N 21/475 |

(Continued)

FOREIGN PATENT DOCUMENTS

| | | | |
|---|---|---|---|
| CN | 103699619 | 4/2014 | G06F 17/30 |
| CN | 111274486 | 6/2020 | G06F 19/9535 |

(Continued)

OTHER PUBLICATIONS

U.S. Appl. No. 18/121,808, filed Mar. 15, 2023, Kuzmenko.

*Primary Examiner* — Tuankhanh D Phan
(74) *Attorney, Agent, or Firm* — Hayes Soloway P.C.

(57) ABSTRACT

Techniques for data retrieval and display with grouped context-based categorization in response to a contextless keyword entry query include initiating a data search query consisting of a keyword entry without contextual meaning. A data search corresponding to the keyword entry is processed in a database using an algorithm to locate within the database a first data result having at least one data file relating to a 'what' context of the keyword entry, and a second data result having at least one data file relating to a 'why' context of the keyword entry. First and second visual icons corresponding data file of the first or second data result are displayed separately from each other. In response to a user selection of the first or second visual icons, content of the first data result or the second data result is displayed.

20 Claims, 12 Drawing Sheets

(56) References Cited

U.S. PATENT DOCUMENTS

| | | | |
|---|---|---|---|
| 2018/0176276 A1 | 6/2018 | Gandhi et al. | H04L 29/06 |
| 2018/0349467 A1 | 12/2018 | Malhotra et al. | G06F 17/30 |
| 2018/0373754 A1* | 12/2018 | Xu | G06F 16/242 |
| 2019/0026370 A1 | 1/2019 | Brownstein et al. | G06F 17/30 |
| 2019/0179852 A1 | 6/2019 | Fei | G06F 16/735 |
| 2019/0220537 A1 | 7/2019 | Kohlmeier et al. | G06F 17/30 |
| 2019/0325069 A1 | 10/2019 | Santos et al. | G06F 17/30 |
| 2019/0370305 A1 | 12/2019 | Liu et al. | G06F 16/9538 |
| 2020/0159795 A1 | 5/2020 | Weldemariam et al. | G06F 16/9535 |
| 2021/0357447 A1 | 11/2021 | McKenzie | G06F 16/58 |
| 2022/0070129 A1 | 3/2022 | Boyd et al. | H04L 12/58 |
| 2022/0245215 A1 | 8/2022 | Mihara | G06F 16/9538 |
| 2022/0256247 A1 | 8/2022 | Cao et al. | H04N 21/478 |

FOREIGN PATENT DOCUMENTS

| | | | |
|---|---|---|---|
| CN | 115334363 | 11/2022 | H04N 21/488 |
| WO | WO 2012/059119 | 5/2012 | G06F 17/30 |

\* cited by examiner

420

422 — A plurality of data search queries are initiated on a first computerized device, the plurality of data search queries each consisting of only a keyword entry, wherein the keyword entry is free from contextual meaning.

424 — A data search is processed in a database of a second computerized device for each of the plurality of data search queries, the data search corresponding to the keyword entry, wherein the second computerized device is in communication with the first computerized device, whereby processing the data search includes using at least one algorithm to locate within the database data results consisting of: a first data result having at least one data file relating to a 'what' context of the keyword entry; a second data result having at least one data file relating to a 'why' context of the keyword entry; and third data result having at least one data file relating to an additional context of the keyword entry.

426 — A first visual icon corresponding to the at least one data file of the first data result, a second visual icon corresponding to the at least one data file of the second data result, and a third visual icon corresponding to the at least one data file of the third data result are displayed on a display device of the first computerized device, wherein the visual icon corresponding to the first, second, and third data results are displayed separately from one another.

428 — In response to a user selection of one of the first, second, or third visual icons, content of the first, second, or third data result, respectively, is displayed.

FIG. 12

DATA RETRIEVAL AND DISPLAY WITH GROUPED CONTEXT-BASED CATEGORIZATION IN RESPONSE TO CONTEXTLESS KEYWORD QUERIES

CROSS REFERENCE TO RELATED APPLICATION

This application claims benefit of U.S. Provisional Application Ser. No. 63/319,327 filed Mar. 13, 2022, the entire disclosure of which is incorporated herein by reference.

FIELD OF THE DISCLOSURE

The present disclosure is generally related to computerized data processing and more particularly is related to data retrieval and display with grouped context-based categorization in response to contextless keyword entry queries.

BACKGROUND OF THE DISCLOSURE

Data is ubiquitous in today's digital age, and businesses and organizations of all sizes are generating and collecting vast amounts of data on a daily basis. However, the challenge of managing and making sense of this data can be daunting. To derive meaningful insights and actionable information from data, it is important to organize and categorize it in a structured and systematic way. Existing techniques and technologies for data categorization, such as manual categorization, keyword tagging, and rule-based approaches, have limitations in terms of scalability, accuracy, and efficiency. Manual categorization, for example, is time-consuming and prone to errors, while keyword tagging and rule-based approaches may not capture the full context and nuances of the data.

Those who seek data or information about a particular topic are often inundated with results. For instance, a search in a search engine such as GOOGLE® or BING® for a particular topic often yields millions of results which are only listed by basic relevance to keywords. In some situations, those results can be filtered based on type of result, e.g., an image, a news story, a video, a map, or another particular format of the data corresponding to that keyword. To obtain contextual data results to a keyword search, the search query often needs to include the context of the subject of the search within the query terms, e.g., "what is an algorithm?" where 'what is' provides the context of the query for the subject of the 'algorithm'. Even when context within the query is provided, the results received are still often mediocre at best, as the resulting data is still provided based on relevance to the search query and not on providing the particular desired context of the searched subject.

Thus, a heretofore unaddressed need exists in the industry to address the aforementioned deficiencies and inadequacies.

SUMMARY OF THE DISCLOSURE

Embodiments of the present disclosure provide a computer-implemented system for electronic data retrieval and display with grouped context-based categorization in response to a contextless keyword entry query on a computerized device having a processor capable of executing computer executable instructions stored on a memory of the computerized device. Briefly described, in architecture, one embodiment of the system, among others, can be implemented as follows. A first computerized device has input/output interfaces configured to receive a data search query from a user, the data search query consisting of a keyword entry without contextual meaning. A second computerized device has a data search platform and a database, wherein a data search is processed in the database, the data search corresponding to the keyword entry, wherein the second computerized device is in communication with the first computerized device. Processing the data search includes using at least one algorithm to locate, within the database: a first data result having at least one data file relating to a 'what' context of the keyword entry; and a second data result having at least one data file relating to a 'why' context of the keyword entry. A first visual icon corresponding to the at least one data file of the first data result and a second visual icon corresponding to the at least one data file of the second data result are displayed on the display device of the first computerized device visible to user, wherein the visual icon corresponding to the first data result is displayed separately from the visual icon corresponding to the second data result, wherein, in response to a user selection of one of the first visual icon or the second visual icon, content of the first data result or the second data result, respectively, is displayed.

The present disclosure can also be viewed as providing computer-implemented methods for electronic data retrieval and display with grouped context-based categorization in response to a contextless keyword entry query on a computerized device having a processor capable of executing computer executable instructions stored on a memory of the computerized device. In this regard, one embodiment of such a method, among others, can be broadly summarized by the following steps: initiating by user a data search query on a first computerized device, the data search query consisting of a keyword entry without contextual meaning; processing a data search in a database of a second computerized device, the data search corresponding to the keyword entry, wherein the second computerized device is in communication with the first computerized device, whereby processing the data search includes using at least one algorithm to locate within the database: a first data result having at least one data file relating to a 'what' context of the keyword entry; and a second data result having at least one data file relating to a 'why' context of the keyword entry; displaying, on a display device of the first computerized device, a first visual icon corresponding to the at least one data file of the first data result and a second visual icon corresponding to the at least one data file of the second data result, wherein the visual icon corresponding to the first data result is displayed separately from the visual icon corresponding to the second data result; and in response to a user selection of one of the first visual icon or the second visual icon, displaying content of the first data result or the second data result, respectively.

The present disclosure can also be viewed as providing computer-implemented methods for electronic data retrieval and display with grouped context-based categorization in response to a contextless keyword entry query on a computerized device having a processor capable of executing computer executable instructions stored on a memory of the computerized device. In this regard, one embodiment of such a method, among others, can be broadly summarized by the following steps: initiating a plurality of data search queries on a first computerized device, the plurality of data search queries each consisting of only a keyword entry, wherein the keyword entry is free from contextual meaning; processing a data search in a database of a second computerized device for each of the plurality of data search queries, the data search corresponding to the keyword entry, wherein the second computerized device is in communication with the first computerized device, whereby processing the data search includes using at least one algorithm to locate within the database data results consisting of: a first data result having at least one data file relating to a 'what' context of the keyword entry; a second data result having at least one data file relating to a 'why' context of the keyword entry; and a third data result having at least one data file relating to an additional context of the keyword entry; displaying, on a display device of the first computerized device, a first visual icon corresponding to the at least one data file of the first data result, a second visual icon corresponding to the at least one data file of the second data result, and a third visual icon corresponding to the at least one data file of the third data result, wherein the visual icon corresponding to the first, second, and third data results are displayed separately from one another; and in response to a user selection of one of the first, second, or third visual icons, displaying content of the first, second, or third data result, respectively.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 11-12 are flowcharts illustrating a computer-implemented method for electronic data retrieval and display with grouped context-based categorization in response to a contextless keyword entry query on a computerized device having a processor capable of executing computer executable instructions stored on a memory of the computerized device, in accordance with embodiments of the present disclosure.

DETAILED DESCRIPTION

Figure 1:
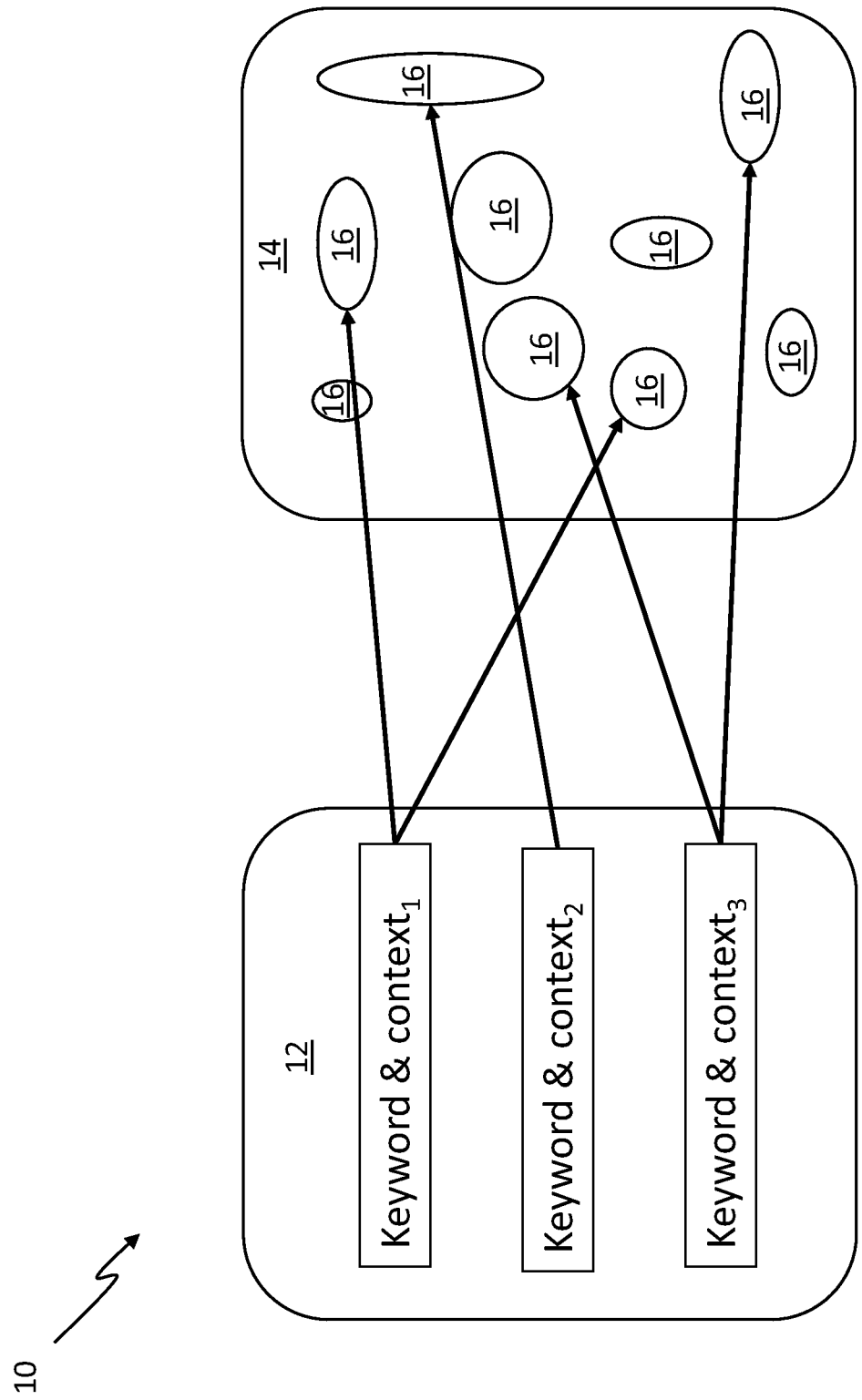
FIG. 1 is a diagrammatical illustration of a keyword with context search, in accordance with conventional techniques.

As noted in the Background, conventional techniques for providing data results to search queries require that a user provide both a keyword and context in a search query. This concept is illustrated in FIG. 1, which is a diagrammatical illustration 10 of a keyword with context search, in accordance with conventional techniques. As shown, in the search query platform 12, such as a conventional Internet search like GOOGLE® or BING®, or in a non-Internet such as a search, a user must input a keyword combined with a context for that keyword, e.g., keyword and $context_1$. If the user desires to run subsequent searches, the user may input a keyword with $context_2$ or a keyword with $context_3$, and so on. When the search is initiated, the searching platform 14 identifies results 16 to the keyword and context search, where those results 16 are based on relevancy to the keyword and context query entry.

As an example of this situation, a user may have a desire to learn more about the topic of binary numbers, as the user may be completely unfamiliar with binary numbers. The user may input a first search query which includes the keyword terms "binary numbers" and context terms "what are" the resulting search query is" what are binary numbers?" In this example, the user has provided both the keyword topic of binary numbers and the context of what the user desires to understand relative to that keyword topic, e.g., what they are. The user may also enter a second search query which is "why use binary numbers" where the keyword topic of binary numbers is maintained, and a new context is provided with the keyword topic, e.g., "why?". In each situation, the searching platform 14 will use conventional search techniques, such as semantics, to locate relevant results to the questions "what are binary numbers?" and "why use binary numbers?"

While conventional searching and data retrieval techniques can sometimes provide accurate results to the search topic and context of that topic, they are also highly prone to providing results which are not relevant. This is because conventional search and data retrieval techniques are designed to provide a significantly large quantity of information to answer a question, which may or may not be relevant, versus providing less information which is highly relevant. More times than not, a user is required to spend a length of time reviewing search results to try to determine what is relevant, and from there to try and glean from the content of those search results the answer to their initial query. This is inefficient and often results in a user not getting accurate information to their initial search query.

Additionally, conventional search and data retrieval techniques almost always require a context of the search term, but in many situations a user may not be able to provide a context, or an accurate context. For instance, a user may desire to learn information about the topic "11111111" but he or she may be wholly unfamiliar with any aspect of binary number, such that the user is unable to provide a context for "11111111". In this situation, the user would have to search with just the keyword "11111111" and review the results in order to even understand a base meaning for that keyword such that they could then enter a query for the context relevant to that keyword, such as, "what does 11111111 mean?" In this example, a user may have to conduct two or three different searches before being able to determine that "11111111" is binary value for "255" as a decimal representation.

Figure 2:
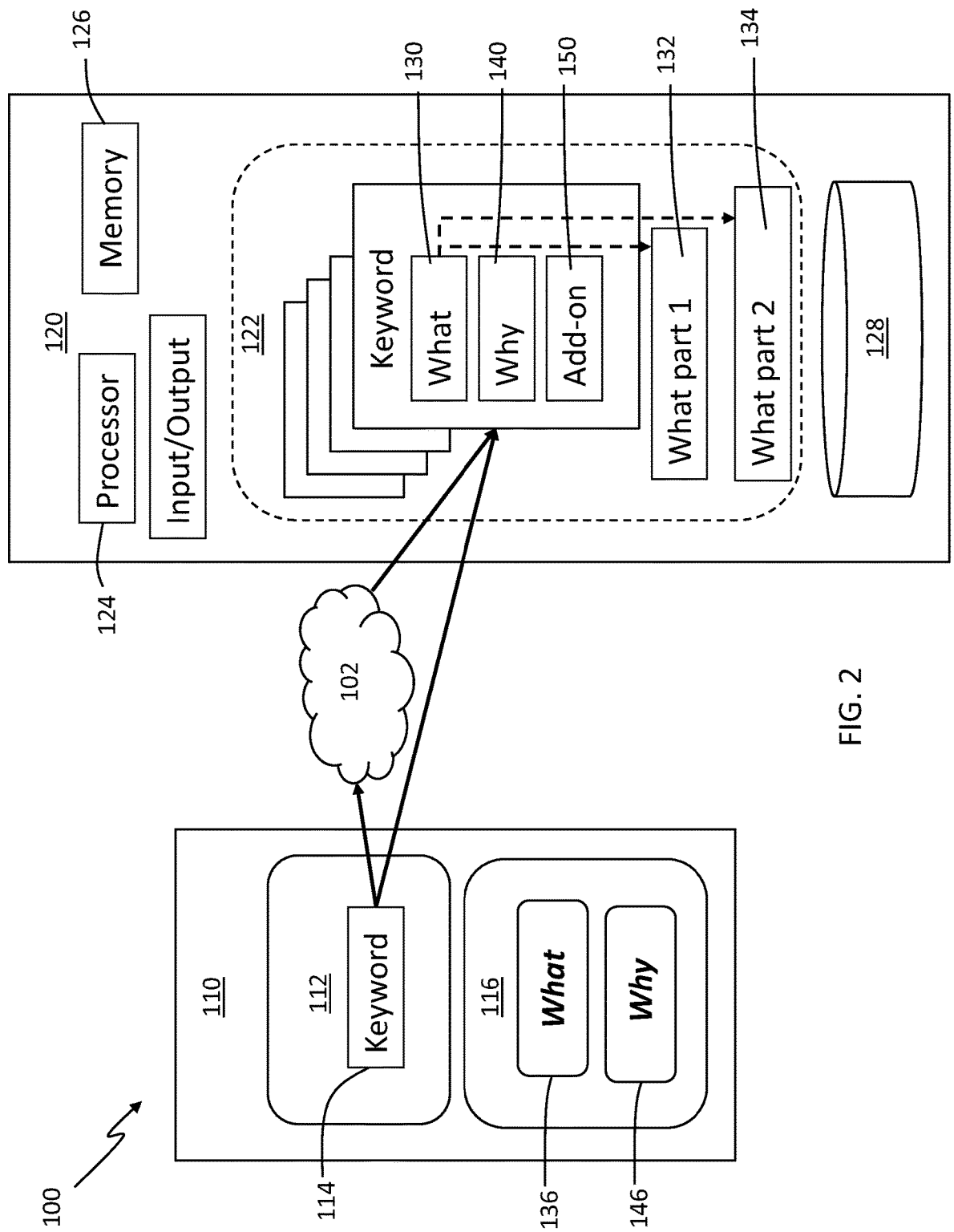
FIG. 2 is a diagrammatical illustration of a system computer-implemented system for electronic data retrieval and display with grouped context-based categorization in response to a contextless keyword entry query, in accordance with embodiments of the present disclosure.

To improve electronic data retrieval in response to queries, this disclosure is directed to a computer-implemented system for electronic data retrieval and display with grouped context-based categorization in response to a contextless keyword entry query 100, of which, FIG. 2 is a diagrammatical illustration of, in accordance with embodiments of the present disclosure. The computer-implemented system for electronic data retrieval and display with grouped context-based categorization in response to a contextless keyword entry query 100, which may be referred to herein as 'system 100', includes a first computerized device 110 having an input part of an input/output interface 112 configured to receive a data search query 114. For instance, a user may utilize a local computing device or a front end computing device which is connected to the Internet via one or more networks, where the computing device uses a searching platform such as a search engine or similar application. The front end computing device may be any type of computing device, such as a desktop computer, a laptop, a smart device, or any other type of computerized device.

The data search query 114 provided by the user consists only of a keyword, or a keyword entry which may include one keyword or more than one keyword, all without added contextual meaning. While a keyword may have some inherent context within the word itself, or within multiple keywords themselves, in accordance with this disclosure, a keyword or keywords without added contextual meaning is understood to be a keyword or keywords which are not focused on the keyword(s) topic's multiple features, contexts, or applications. For instance, the keyword entry without added contextual meaning does not have any semantical question phrase associated therewith, such that the keyword term, or terms, are free from the use of "what", "why", "where", "when", "how", or "who", or other similar terms. As an example, the keyword or a keyword entry, such as one that includes multiple keywords, may be "binary numbers" without any associated semantical questioning phrase. While "binary numbers" has some inherent context, such that it pertains to numerics and involves a binary structure, it lacks added contextual meaning. In one preferred example, a keyword entry without added contextual meaning lacks any use, explicit or implicit, of the term or terms "what", "why", "where", "when", "how", or "who", or other similar terms which denote added context to a keyword entry.

When the search query with the keyword entry is received, the query may be communicated to a searching platform 122, or data search platform, in a second computerized device 120, such as through a network connection 102. The second computerized device 120 may be a centralized server or other back end computer device, which has one or more processors 124, a memory 126, and any number of input/output features including communication network to external devices. The second computerized device 120 may also have one or more databases 128 which includes quantities of data stored thereon, to which the searching platform 122 is in communication with and retrieves results in response to search queries. The searching platform 122 may include various algorithms and computing functionality to retrieve results from the database 128 based on the search query. It is noted that the second computerized device 120 with a data search platform 122 and a database 128 can handle requests from multiple computerized devices 110 with input/output interfaces 112 facing users.

When a data search is processed by the processor 124 of the second computerized device 120, the searching platform 122 may execute a search within the database 128 to retrieve results, where the data search corresponds to the keyword entry used in the data search entry 114 by the user in the first computing device 110. Processing the data search includes using one or more algorithms to locate, within the database 128 a first data result having at least one data file 130 relating to a 'what' context of the keyword entry, and a second data result having at least one data file 140 relating to a 'why' context of the keyword entry. For example, the first data result having at least one data file 130 relating to a 'what' context of the keyword entry may provide the user with information which answers "what" the topic keyword entry is, e.g., "what are binary numbers" while the second data result having at least one data file 140 relating to a 'why' context of the keyword entry would provide the user with information about "why" relative to the keyword entry topic, e.g., "why are binary numbers used" or a similar 'why' question.

Regardless of the keyword entry or the keyword entry topic, and regardless of how simplistic or complex the keyword entry or keyword entry topic may be, the first and second data results will always provide a 'what' context and a 'why' context answer's part to the data search. This consistent result is important to provide immediate and clear context to any keyword entry search to the user, such that the user can readily and efficiently be presented with information that answers these contextual points about the keyword entry. Enforcement of the topics structure of the search data results in 'what' and 'why' context answers is mandatory. The results with the contextual points are preserved in a consistent and predefined structure, versus the structure of conventional techniques which do not organize based on context. At best, conventional techniques organize by type of result, e.g., image, video, map, etc., which is independent of context.

Additionally, the 'what' and 'why' contexts provided to the user relative to the keyword entry may be provided individually, e.g., as separate subparts, without affiliation and without combination with any other contexts. This may act to keep the result provided to the user as clear and as relevant as possible to these contextual points. Thus, unlike conventional searching which provides a significant multitude of results which may or may not be relevant, the system 100 provides only a few results which have perfect relevancy to the keyword entry searched. As an example, a search on the GOOGLE® search engine for "binary numbers" retrieves 368 million results which are not organized or categorized in any particular way except by what the search engine believes is most relevant. In the subject system 100, a search for "binary numbers" may retrieve two search results: a 'what are binary numbers' result with a corresponding data file providing information on what binary numbers are, and a 'why are binary numbers used' result with a corresponding data file providing information on why binary numbers are used. These two search results may also be understood as two subparts of one search result which includes the 'what' and 'why' components relative to the keyword entry.

It is also noted that the system 100 may provide additional data results which are categorized to the keyword entry. For example, the algorithm used to locate the first and second results within the database may also locate a third data result having at least one data file 150 relating to an additional context of the keyword entry. In FIG. 2, this third data result is identified as an 'Add-on' result, and it may provide additional contextual information relative to the keyword entry, for instance, to answer the 'how', 'who', or 'when' questions, or to provide another context. In the running example of binary numbers, the third data result may provide context about 'when binary numbers were developed' or 'when are binary numbers used?', or another context.

It is further noted that the system 100 may utilize the searching platform 122 in a database 128 where the content to provide the first, second, or any subsequent data result is compiled, e.g., preprocessed on or before adding, in the database 128 prior to the search query being initiated. In other words, the results to the 'what' and 'why' context questions for a given keyword entry term are populated in the database before the user even initiates a search based on that keyword entry. This pre-population of the data to categorize or aggregate the contextual data for a given keyword entry can be independent of the action of initiating the search by the user, which allows for a faster retrieval of results over conventional searching techniques, and also allows for the contextual results to be even further refined over time to ensure they provide the most accurate information to the user relative to the context of the keyword entry search. For instance, the data file 130 corresponding to the context of 'what' for binary numbers, in the running example, can be refined and updated over time by any number of authors or stakeholders such that the data file contains highly accurate and useful information relative to this context. In contrast, conventional data searching does not retrieve context specific results which are as accurate, unless the user provides the desired context within the keyword entry search and the search engine happens to locate a particular result as being the most relevant.

The data results provided by the system 100 may include more than one data file. For instance each data result corresponding to each context, e.g., 'what', 'why', or another context, may include multiple parts of that context which are provided to the user in multiple files. In FIG. 2, multiple files are depicted for the 'what' context in the first data file 130, where the 'what' context is given as 'what part 1' 132 and 'what part 2' 134. For example, a data result to a keyword entry search for "binary numbers" may yield a first data file which answers a basic question of "what are binary numbers?" and subsequent data files which answer more complicated questions of "what are binary numbers?" As an illustration of this point, the first data file may include information explaining that a binary number is a numerical system which uses only two symbols, whereas a second data file may include information explaining what the binary language looks like, or what variations it includes, or what symbols can be used to represent it, etc. Thus, the data results may include sequentially categorized content corresponding to the first data result or the second data result, respectively, or any other data result.

Typically, the system 100 may provide these results to the user as different parts of a contextual answer, with a data file corresponding to each part, such that the various parts are separated. However, it is noted that any manner of providing these results may also be used. In one example, each part takes no more than 15 minutes to review by a user, such that if a part takes longer than 15 minutes to review, it may be split into two or more parts. Similarly, the content of the data results may be separated by other criteria, such as by the author or authors who generated that content. For instance, search results can be provided by two independent authors, while content from each author to preserve the similar structure—the first part to correspond to 'what' context, and second part to correspond to 'why' context. Or, for instance, a first portion of content within the first data result may correspond to what a first author provided whereas a second portion of content within the first data result may correspond to what a different author provided. Additionally, it is noted that who aggregated or grouped results subparts and when they are grouped can be implemented such that a user conducting the search will save time on not aggregating sequenced parts of contextual data result himself. This is further aided by using the searched output data result, the structure of which is enforced as 'what' and 'why' context results to the keyword entry, and by the resulting data being preliminary preprocessed and conveniently provided to the user who initiated the search.

Referring back to FIG. 2, the first computer 110 may include a display device 116 on which visual icons can be presented, where those visual icons correspond to the data files retrieved by the searching platform 122 in the second computerized device 120. In FIG. 2, the visual icons are depicted as a 'what' icon 136 and a 'why' icon 146, where the first visual icon ('what' icon 136) corresponds to the at least one data file 130 of the first data result and a second visual icon ('why' icon 146) corresponds to the at least one data file 140 of the second data result. These icons 136, 146, and any additional context-indicating icons, may be displayed on the display device 116 of the user's device such that the user can click or otherwise engage with the icon to retrieve the underlying contextual information from the corresponding data search. It is noted that the visual icon 136 corresponding to the first data result is displayed separately from the visual icon 146 corresponding to the second data result, and any other visual icons are also displayed separately, such that a user can clearly and easily differentiate between the results and achieve the context-specific information with ease.

When a user selects one of the first visual icon 136 or the second visual icon 146, content of the first data result or the second data result, respectively, is displayed on their display device 116. Similarly, a third visual icon (not shown) which corresponds to the at least one data file 150 of the third data result may also be displayed on the display device 116 of the first computerized device 110, where the visual icon corresponding to the third data result is displayed separately from the visual icons 136, 146 corresponding to the first data result and the second data result.

The visual icons may include any type of icons, such as graphical depictions of an underlying file, a photograph, text, or any type of hyperlinked visual item. The data file to which the visual icon corresponds may be any type of data file. In one example, the content may be video content which is within a video data file. In other examples the content may be textual, graphical, alphanumerical, or any other type of content which is provided in any type of computerized data file, including, in one example, an audio book. It is also noted that the visual icons for the data results may include sequentially categorized content corresponding to the data results.

Figure 3:
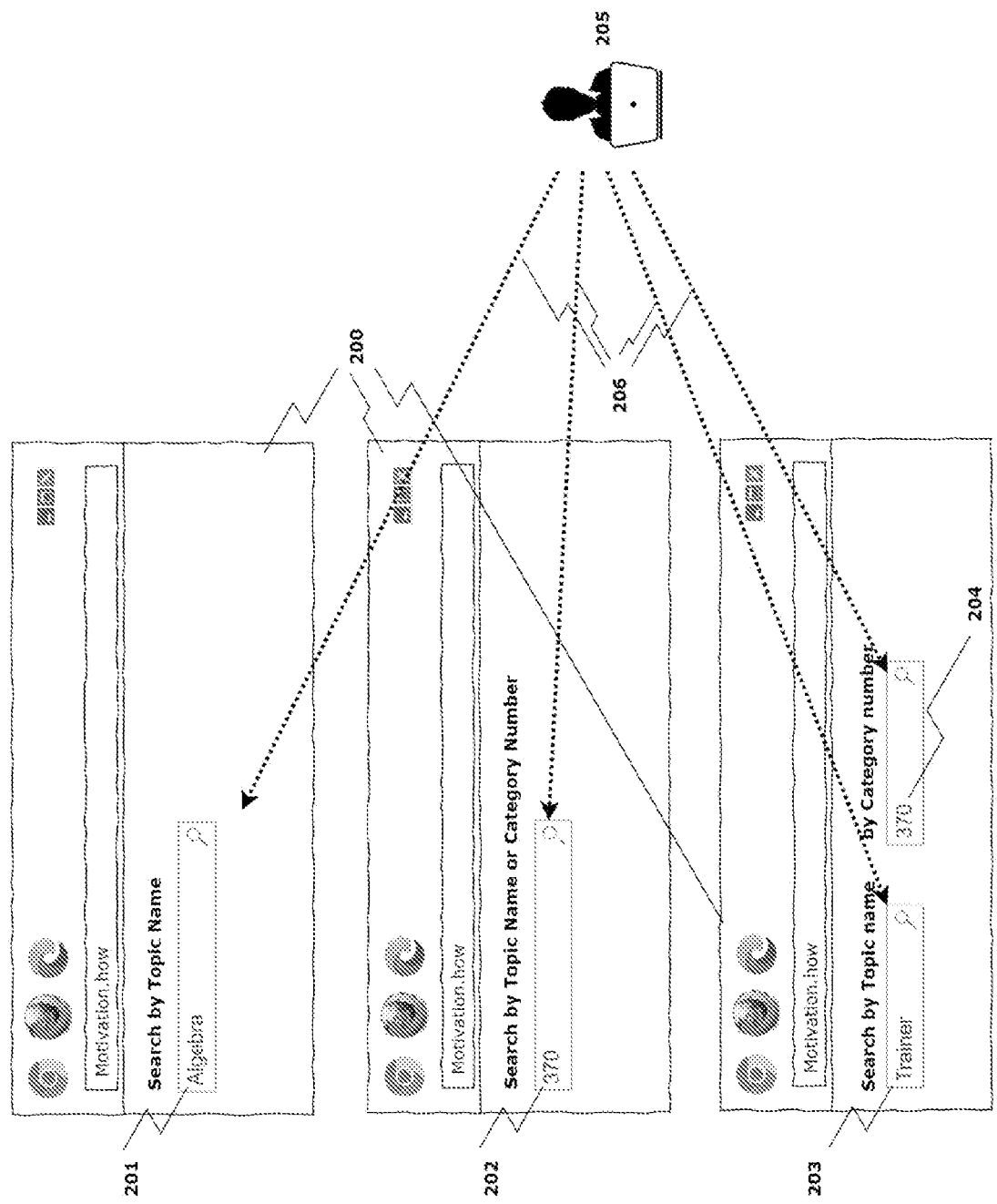
FIGS. 3-7 are diagrammatical illustrations of the computer-implemented system for electronic data retrieval and display with grouped context-based categorization in response to a contextless keyword entry query of FIG. 2, in accordance with embodiments of the present disclosure.

As can be understood, the subject disclosure provides for the retrieval and presentation of information for each single topic, when each topic is selected or searched by the user, which includes dividing each topic into ordered sequence of mandatory and optional parts ('What?', 'Why?' and optionally 'Add-on'), and possible splitting parts into ordered sequence of subparts, and optionally providing multiple information sources for each topic, each to contain the same parts and possibly subparts structure. The main overall goal is to have a consistent logical structure for faster and simpler information understanding by the user. To further explain the system 100 and to provide specific examples and variations of the system 100, FIGS. 3-7 are diagrammatical illustrations of the system computer-implemented system for electronic data retrieval and display with grouped context-based categorization in response to a contextless keyword entry query 100 of FIG. 2, in accordance with embodiments of the present disclosure. Relative to FIG. 3, it shows one example interface of entering a keyword entry into a search query. The top part with input field 201 may be seen by a user 205, for instance in a web-browser 200. This field can be used to enter a word or words using primarily alphabet letters to search by 'Topic Name'. Alternatively searching could be done by other criteria, for example by 'Category Number'. Categorization may be seen as keeping a list of 'Category Numbers' mapped to certain scientific, or technological, or any other subjects. And information topics (subject for further search) may have assigned one or several 'Category Numbers'. In this case, a single input field may be used to enter 'Category Number' for searching instead of 'Topic Name'. The middle part shows an example of a different way to search, where instead of input field 201 which allows one to search by 'Topic Name', an input field 202 is provided (the same or a different input field) which may be used to search by 'Category Number'. The lower part of FIG. 3 shows an example of several input fields, each for specific search criteria.

The web-browser 200 software seen by the user may look different in terms of available input fields. The software could be web-browser, with 'Client-Server' approach, stand-alone software, or software of any other kind. A single field 201 to search by 'Topic Name' only may be used. Alternatively, a single input field 202 to search by any of two criteria ('Topic Name' or 'Category Number') may be used. Alternatively, two separate input fields may be used—field to search by 'Topic Name' 203 and field to search by 'Category Number' 204. Other input ways may also be used. In any situation, the user 205 may enter a search query 206 with words or numbers using alphabet letters or digits into respective input search fields, 201, 202, 203, or 204 depending on implementation.

Figure 4:
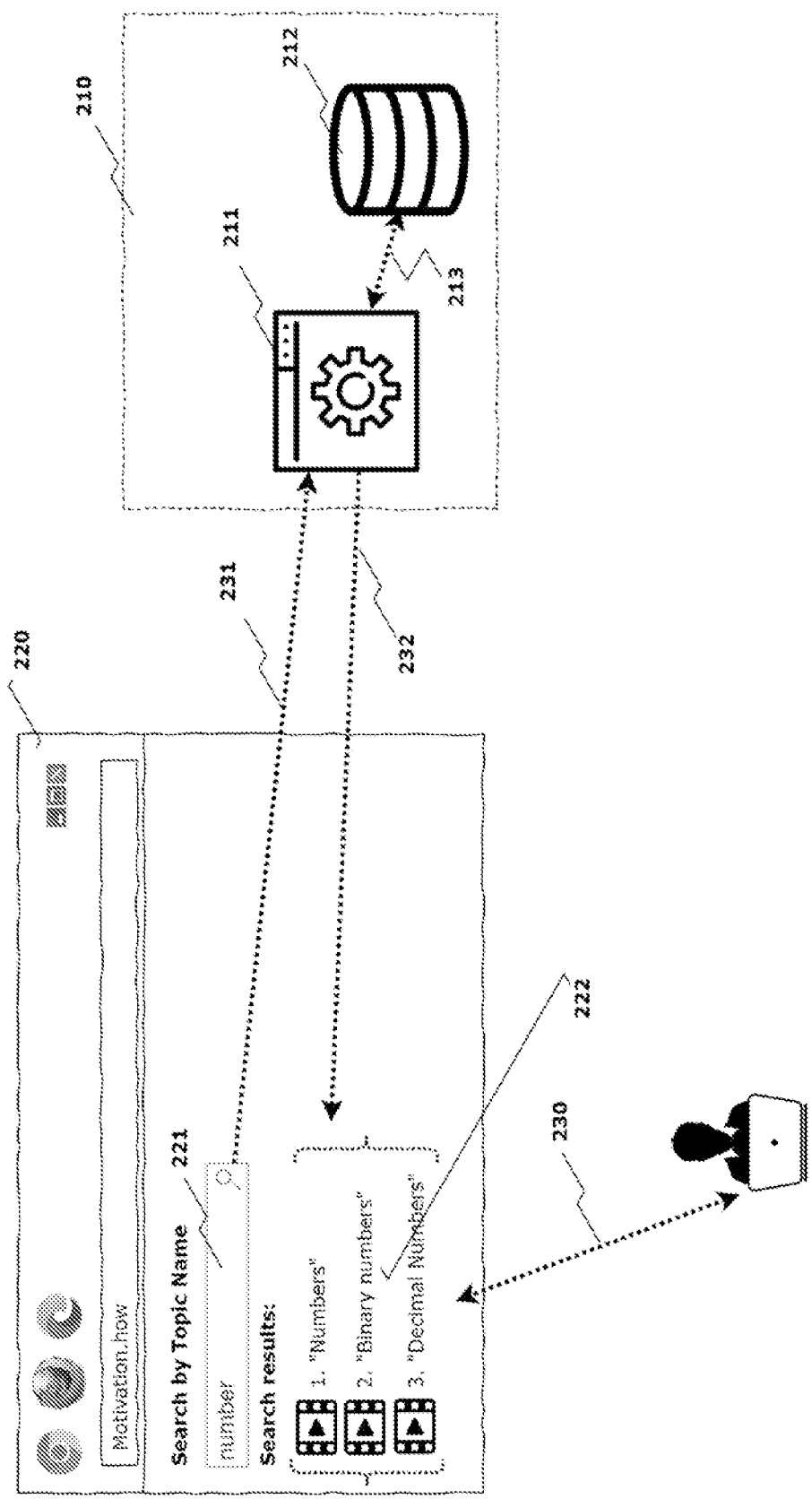

FIG. 4 depicts a diagram illustrating one example of an overall operation of the system. For instance, FIG. 4 depicts one example of the output search result with a simplified sequence of steps for providing such result. The user's computing device, or the so-called 'front end' part of the system, may be seen by the user and includes searching topic software 220. In the case of 'Client-Server' implementation, input data from users may be sent to a remote server 210 which is not visible to user (so-called 'Back-End' part). Server 210 may consist of 'Search Engine' 211, and 'Database' 212 storing all topics-related information for further search.

When a user enters 230 a word or words into input search field 221, the search request 231 goes to a 'Search Engine' 211 on a server side 210. The Search Engine may communicate 213 with database 212 to retrieve data for preparing a response. The search result response goes back 232 to the front-end to be provided as an aggregated search results 222 to be further seen 230 by the user. Search results 222 may include no items (search miss), one item, or several items, based on preliminary entered input data 221 by the user, search algorithm of search engine 211, and available up-to-date data stored in the database 212. The user may further select 230 a specific single topic out of possibly many from search results 222 to see details of such topic. It can be done by mouse button-click on a 'Topic Name' or by any other means.

Figure 5:
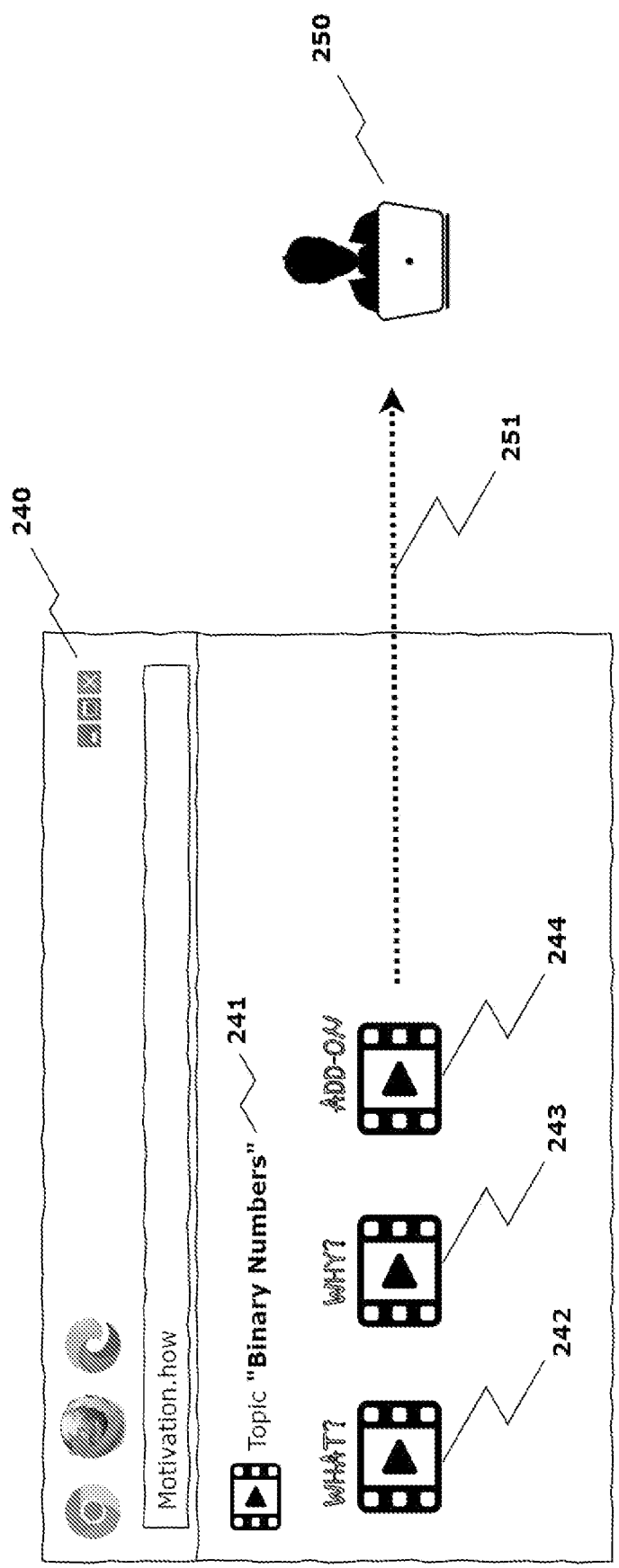

In FIG. 5, a user may be capable of exploring a single topic, once selected, which is divided into parts. For example, item 240 is an example of software for searching topics to be seen by the user. Once the topic is chosen from the search results in a previous step, topic name 241 may be selected and its separate parts may be viewable in certain order to be seen 251 by the user 250. Mandatory parts to be seen are: Part #1 'What?' 242, answering the question 'What the topic is about?', and Part #2 'Why?' 243, answering the question 'Why the topic might be useful for a user?' or a similar 'why' question. Optionally topics may be complemented by Part #3 'Add-on' 244 with information not clearly a good fit within the first two mandatory parts (e.g., falling into other contextual categories like "where", "when", "how", or "who", or others). Each part may have links to information sources of a certain type, for example, video, audio book, or any other source of information.

Figure 6:
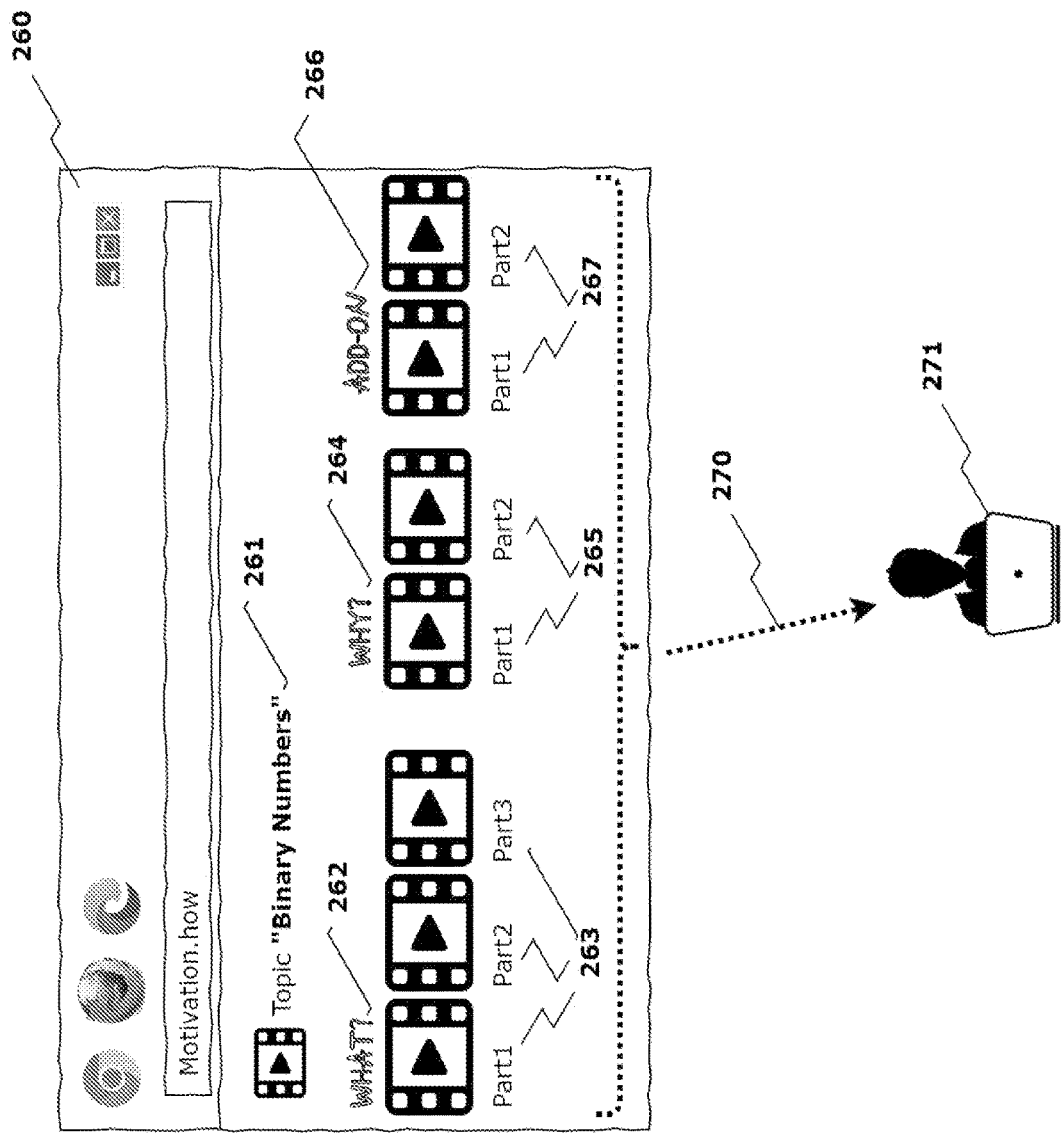

FIG. 6 depicts an example of software for searching topics to be seen by the user at screen 260. The user 271 can see 270 details of the selected topic 261 divided into sub-parts. Mandatory Part #1 'What?' 262 may be divided into an ordered sequence of separate sub-parts 263 answering the question "What?" (What the topic is about?). Mandatory Part #2 'Why?' 264 may also be divided into an ordered sequence of separate sub-parts 265 answering question "Why?" (Why the topic might be useful for a User? or a similar 'why' question). Optional Part #3 'Add-on' 266 may also be divided into ordered sequence of separate sub-parts 267. The number of subparts could be different for each part and depends on content and its length.

Figure 7:
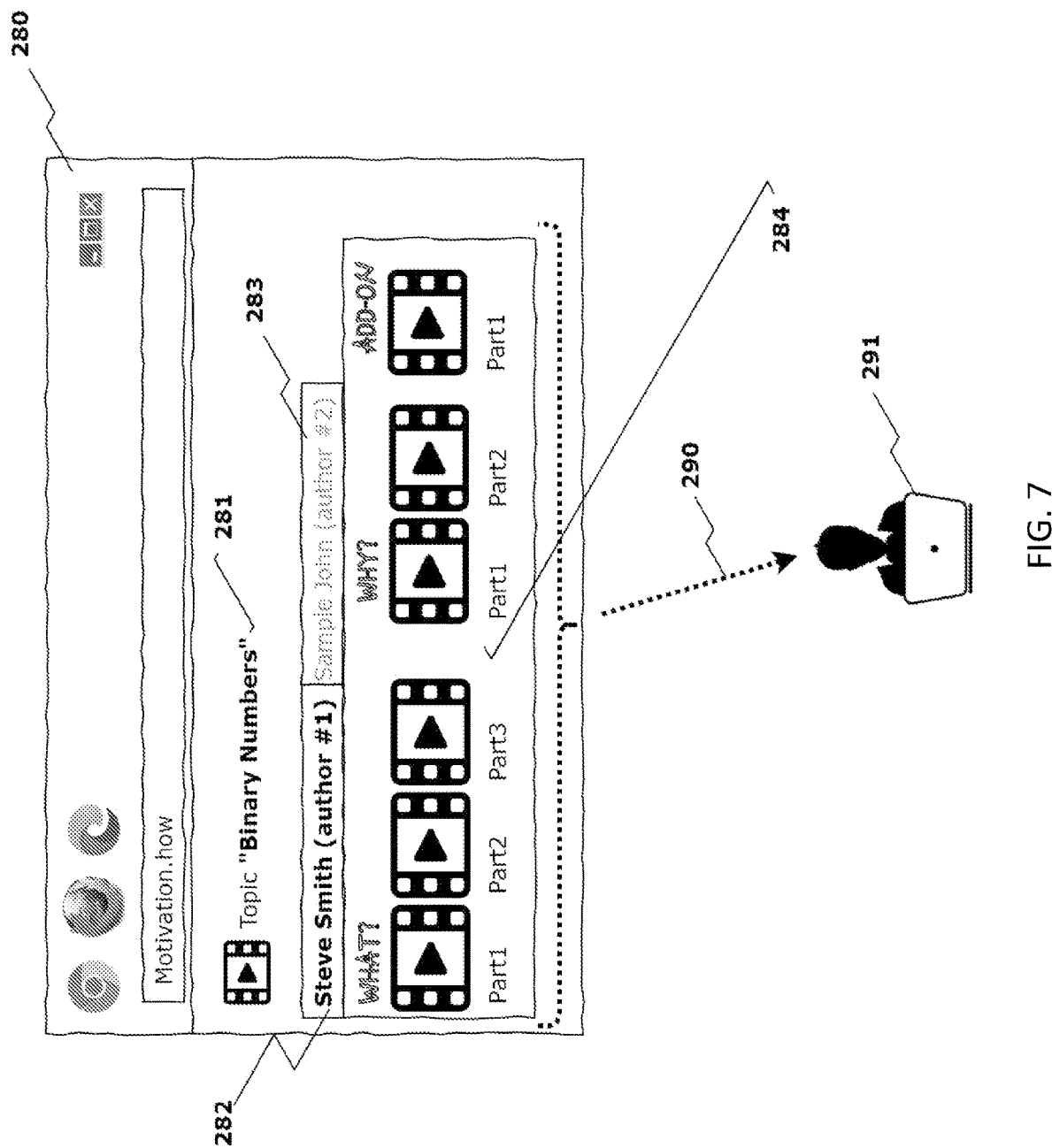

As shown in FIG. 7, when a user selects a single topic, it may provide a result from different or alternative data sources, for example, from multiple authors). Here, item 280 is an example of software for searching topics to be seen by the user. User 291 can see 290 details of a selected topic 281, which can be represented by multiple alternative data sources. Data sources could be, for example, videos, or audio books, or of any other type. In the example of FIG. 7, this consists of two alternative sources—from two different authors. The user can select and view information from the first author 282, or from second author 283. Any number of alternative sources per each topic could be different. When a certain source is selected (for example from the first Author), information from selected source 284 is seen 290 by the user 291 in the same format as discussed in the previous FIGS. 5-6.

Relative to FIGS. 3-7, the system 100 may be implemented using specialized software, in combination with computing hardware, where the computer software may be any other type of software (web-based, stand-alone, or of any other kind). Such software should have the capability to receive input data from users to be used for further information search. Well-known ideas can be utilized, when one or several input data fields 201-204 are to be used (for example, fields—special spaces to be seen within a software visible part on a computer screen). Users can enter words, numbers using alphabet letters, digits, or special characters into any input data field. The software providing information topic search functionality may have the possibility to receive input data from a user. Such input data is further used to find lists of topics related to a given input data. The software may allow the process of searching to start once input data was entered, or it could be done by entering a special key on a computer keyboard, or by pressing a special 'search' button, or by any other means depending on types of software and data input devices available.

The software to provide search results can utilize various configurations and architectures, such as the user-facing part ('Front-End') can receive input data 221 preliminarily entered by the user 230, and send it 231 to software's 'Back-End' part 210, which has 'Search Engine' 211 with certain algorithms for searching topics based on input data from user and up-to-date information in Software's information 'Database' 212. Search results 232 can be provided as a list of found topics 222. The list can be empty in case of a search miss, or the list can have one or more topics if found. User may select any single topic from the list to reach semantically meaningful information parts. The software may have the possibility to make search results visible to user, for example in the form of list of found topics with their respective names (constructed from human language words, numbers, and special characters, if needed).

As an example of operation, in a first step, a user enters input data to 'Input Data Field' 221, 201, 202 or to two input fields 203 and 204, or to any other combination of input fields, if available. Then the user initiates a search by pressing a special key or any 'search' button, where applicable. At the second step, the input data is sent inside search request 231 from user-facing 'Front-End' part of software to 'Back-End' part 210 of software not visible for user, in particular a search request to come to 'Search Engine' subpart 211. In the third step, the search engine uses data from search request 231, data stored in database 212 by means of communication 213 between search engine 211 and database 212. There may be other sources of input data to be taken into consideration. At the fourth step, based on mentioned input data and internal searching algorithms, the search engine may prepare and send output search results 232 from 'Back-End' 210 to software's 'Front-End' 220. And, in a fifth step, the 'Front-End' may output search results 222 to be visible for user. Depending on software implementation it may be a list of topic names inside a web-browser page on a computer screen, or a list of topics on stand-alone software, or by any other means. In case at least one or more topics are found, the software may provide the capability for a user to select a single topic in order to see more details for that selected topic. Selection could be provided by allowing the user to move a computer's mouse pointer to highlight a selected topic and press the mouse key. Other options depending on software implementation may be available for topic selection.

In architecture, the 'Input Data Field' 221 of the 'Front-End' may have a communication channel with the 'Search Engine' 211 of the Back-End' 210 for sending search requests. The 'Search Engine' 211 may have internal 'Back-End' communication 213 with 'database' 212 for taking into consideration all available topics with topics' enforced ordered structure. 'Search Engine' 211 may have communication with the 'Front-End' to send search results to be provided to a user in the form of a topic list available for further selection of any single topic from that list. The content of each topic should have strictly enforced ordered sequence of parts: 1st part is always to be Part #1 'what?' 242, followed by 2nd Part #2 'Why?' 243, followed by optional Part #3 'add-on' 244. If subparts within any part are presented, they also should be in the ordered sequence: subpart #1, subpart #2, subpart #3, etc. If multiple information sources are available for the topic 282, 283, content of each information source 284 is to be of the same strictly enforced order sequence of parts and subparts, where applicable.

Figure 8:
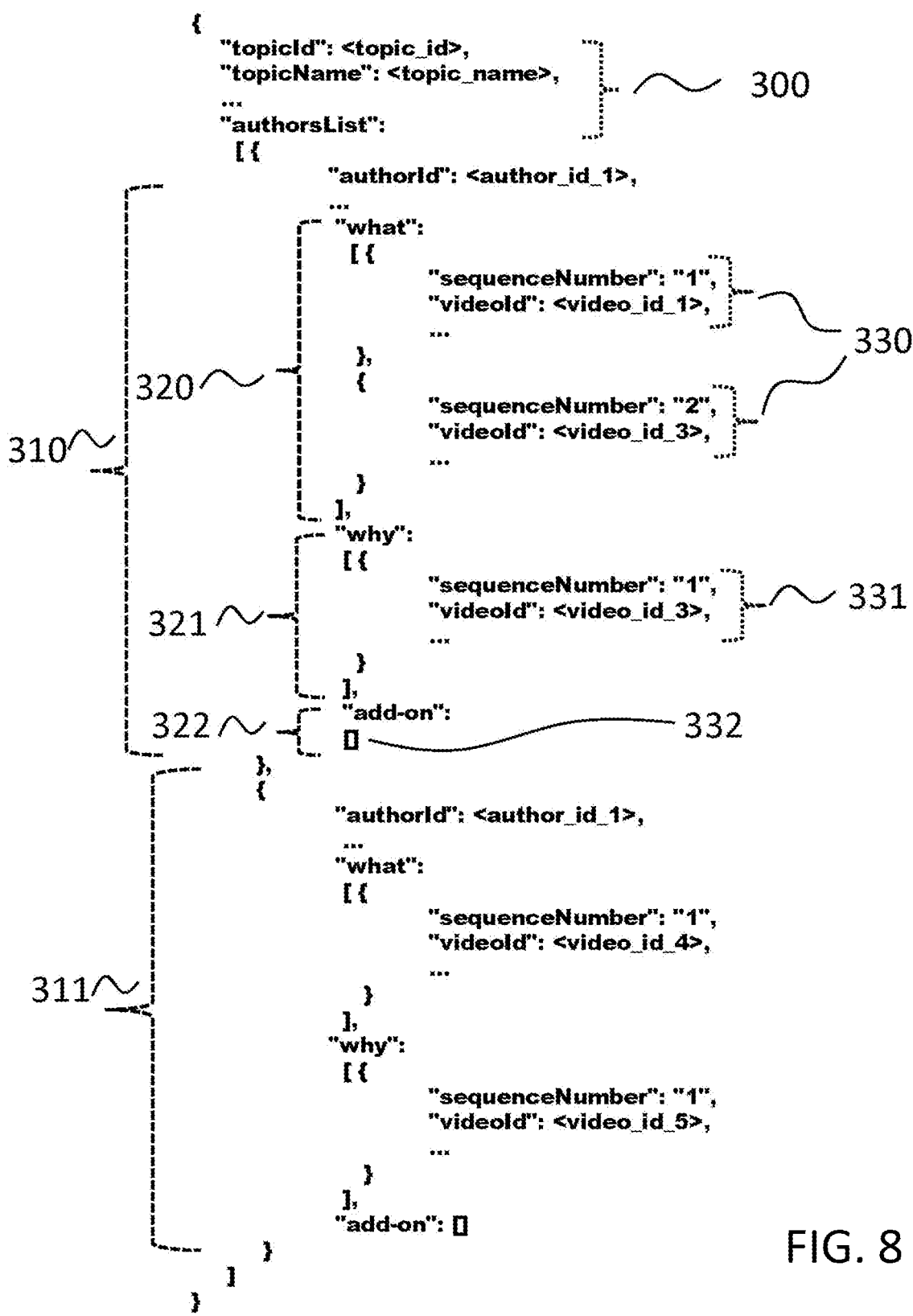
FIG. 8 is schematical view of an example of possible hierarchical structured format of data representation for any single data result to be provided by a second computerized device with a data search platform and a database, in accordance with embodiments of the present disclosure.

In further detail, one example of the processing and retrieval of data may include the use of code within a JSON format. For instance, the process of interacting between 'Front-End' visible to user 220 and 'Back-End' not visible to user 210 may have a step enforced by 'search Engine' Part of Software 'Back-end' 211, usually on Server's side, to ensure that structure of each found topic is always to be preserved. Data structures help in such situations. Different approaches could be used, one of the possibilities of preserving structure is to use Data structure in JSON format as per RFC 8259 Spec. Any topic may utilize the same JSON structure generated by Engine on the way to user, before rendering and showing results in a user-friendly format on a computer's screen. JSON allows arrays or sets of items separated by comma within square brackets, possibly empty without any items, as described in RFC 8259 Spec, section 5, as well as so-called dictionary in format of set of corresponding key-value pair within curly brackets and each key-value pair is separated by a comma (e.g., {key1: value 1, key2: value2, . . . etc.}). JSON format allows to announce nested hierarchy, e.g., each topic 300 to contain one or several blocks of information 310, 311 about authors contributed to this topic, while each block per author in its turn to contain blocks "What?" 320, "Why?" 321 and optionally "Add-on" 322, while each block "What?", "Why?", "Add-on" to contain at least one video part, each part 330, 331, 332 to be numbered in sequence to ensure order of parts (1, 2, 3, etc.), "Add-on" portion 332 may have no parts, since "Add-on" is considered optional. Thus, all mentioned hierarchy to be preserved in sequence of sub-parts' inclusions: topic 310→author(s) per topic [one or a few 320, 321]→"What?" 320, "Why?" 321, "Add-on" 322 sections→Numbered Videos (Part #1, Part #2, . . . ) within each section 330, 331, 332. FIG. 8 is schematical view of an example of possible hierarchical structured format of data representation for any single data result to be provided by second computerized device with a data search platform and a database, in accordance with embodiments of the present disclosure. Specifically, FIG. 8 provides an illustration of the use of the JSON format to reflect hierarchy (subparts of upper level objects, which are to be subparts of objects on a level above, etc.), used with the system 100.

This disclosure describes software behavior and capabilities to provide a single place for searching information topics, with the focus on the structured ordered sequence of mandatory and optional parts and possible subparts of information content, provided as a result of a search. As long as a topic searching functionality is in place and structure within each topic to be seen by the user is enforced, it may not matter what type of software is used (web-based, stand-alone, or any other). It may not matter whether the software is installed and run on a computer, virtual reality glasses, smartphone, or on any other electronic device. The techniques described herein may utilize various types of searching algorithms and data structures. The goal of the techniques disclosed herein are based on the importance to have simple ordered structure of presenting information which would allow the user to understand relatively quickly 'What the topic is about?' and 'Why the topic might be useful for a user?' or a similar 'why' question. The user will preferably (but not necessarily) spend no more than 15 minutes watching, reading, or listening to any part or subpart of the topic.

With regards to searching, there may be various ways of searching which can be utilized. A primary option may include searching by topic name in human language, but this can be optionally complemented by additional alternative ways of searching, including but not limited to the use of topics' categorization (for example, using category numbers set by Dewey Decimal System or using any other categorization system). In case of using categorization, each source of information must have assigned at least one (main, mandatory) or few (auxiliary, optional) category numbers to enable a search mechanism. For example, Dewey Decimal System version 23 has the following numbered categories:

370. 113 'Vocational education', #371. 102 7 'Teaching', #371. 3 'Methods of instruction and study', #658. 3124 'Education and training', which all can be assigned to the topic 'Trainer skills' in the 'Database' 212. Searching by any of these decimal numbers should give output search results containing at least 'Trainer skills' topic with corresponding sources, for example videos. For instance, a system similar to the Dewey Decimal System may be used.

The techniques disclosed herein are an improvement relative to conventional search engines. With conventional search engines, a search result, if successful, will have multiple items or topics. Most search engines provide results in the form of atomic (indivisible) items of the same type, e.g., videos, or texts. Indivisible means that if an item potentially were divided into subparts, any subparts likely would not contain full information of initial topic without losing important semantical parts. In contrast, keyword entry topics disclosed herein are complex, e.g., divisible into subparts, and each subpart carries certain meaningful information. Moreover, the uniqueness of this technology is that it enforces a certain structure of topic and certain order of its subparts. Each topic may have one or a few contributing authors, and a search result would allow the end user to navigate between multiple authors, and select information from any author, if more than one is provided by a search engine. For each selected author, a first mandatory block of a topic will have at least one or a few consecutive videos, answering the question 'What?' (e.g., what the topic is about?), a second mandatory block of a topic to have at least one or a few consecutive videos, answering the question 'Why?' (e.g., why it could be potentially interesting for listeners?), and a third optional block of a topic, if included, to have at least one or a few add-on videos, which authors may additionally share on a top of mandatory blocks 'What?' and 'Why?'.

Figure 9:
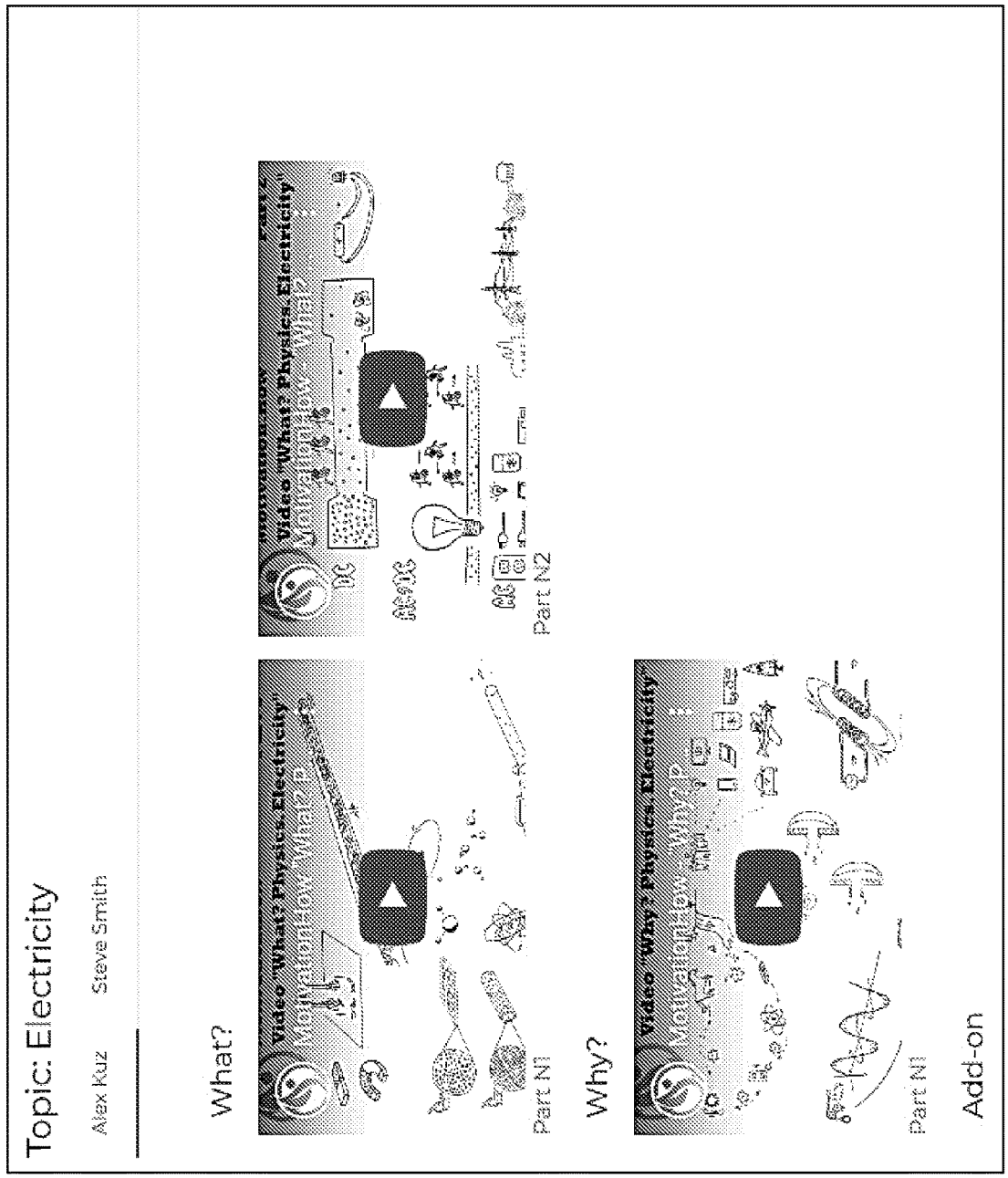
FIGS. 9-10 are graphical depictions of one example of visual icons and the separated positioning of the icons relative to the data search results of the system, in accordance with embodiments of the present disclosure.
Figure 10:
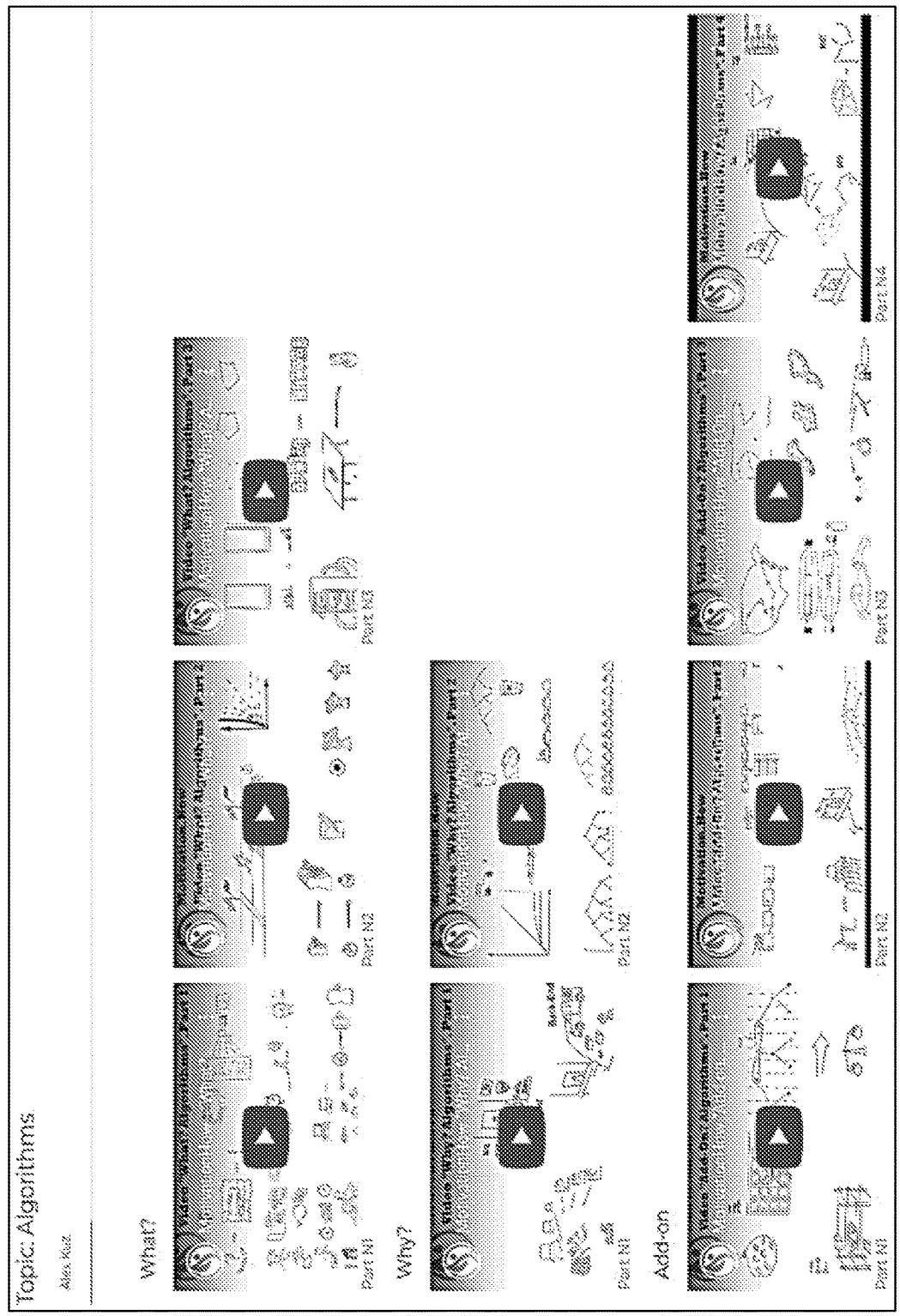

FIGS. 9-10 are graphical depictions of one example of visual icons and the separated positioning of the icons relative to the data search results of the system 100, in accordance with embodiments of the present disclosure. For instance, FIG. 9 illustrates an example where a user can see visual icons corresponding to results for both the 'what' context and the 'why' context, as well as results which are separated by authors on different tabs. FIG. 10, for instance, illustrates a possible example to be seen by an end user, where the visual icons correspond to the two mandatory sections ('what' and 'why') and an optional 'Add-on' section is presented, with multiple sub-parts on each section (numbered Part N1, Part N2, etc.)

Figure 11:
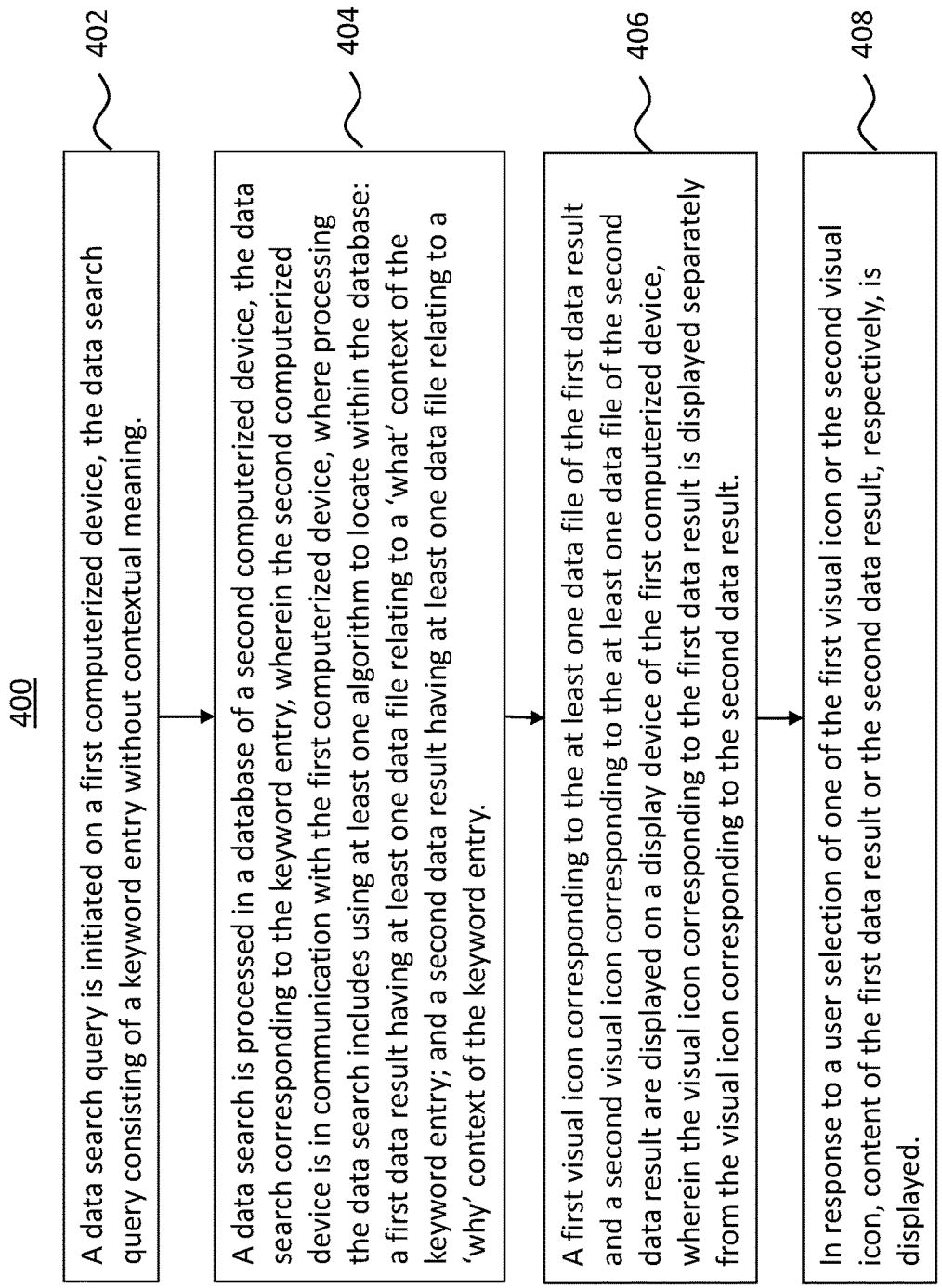

FIG. 11 is a flowchart 400 illustrating a computer-implemented method for electronic data retrieval and display with grouped context-based categorization in response to a contextless keyword entry query on a computerized device having a processor capable of executing computer executable instructions stored on a memory of the computerized device, in accordance with embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 402, a data search query is initiated on a first computerized device, the data search query consisting of a keyword entry without contextual meaning. A data search is processed in a database of a second computerized device, the data search corresponding to the keyword entry, wherein the second computerized device is in communication with the first computerized device, where processing the data search includes using at least one algorithm to locate within the database: a first data result having at least one data file relating to a 'what' context of the keyword entry; and a second data result having at least one data file relating to a 'why' context of the keyword entry (block 404). A first visual icon corresponding to the at least one data file of the first data result and a second visual icon corresponding to the at least one data file of the second data result are displayed on a display device of the first computerized device, wherein the visual icon corresponding to the first data result is displayed separately from the visual icon corresponding to the second data result (block 406). In response to a user selection of one of the first visual icon or the second visual icon, content of the first data result or the second data result, respectively, is displayed (block 408). Any number of additional steps, functions, processes, or variants thereof may be included in the method, including any disclosed relative to any other figure of this disclosure.

FIG. 12 is a flowchart 420 illustrating a computer-implemented method for electronic data retrieval and display with grouped context-based categorization in response to a contextless keyword entry query on a computerized device having a processor capable of executing computer executable instructions stored on a memory of the computerized device, in accordance with embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 422, a plurality of data search queries are initiated on a first computerized device, the plurality of data search queries each consisting of only a keyword entry, wherein the keyword entry is free from contextual meaning. A data search is processed in a database of a second computerized device for each of the plurality of data search queries, the data search corresponding to the keyword entry, wherein the second computerized device is in communication with the first computerized device, whereby processing the data search includes using at least one algorithm to locate within the database data results consisting of: a first data result having at least one data file relating to a 'what' context of the keyword entry; a second data result having at least one data file relating to a 'why' context of the keyword entry; and a third data result having at least one data file relating to an additional context of the keyword entry (block 424). A first visual icon corresponding to the at least one data file of the first data result, a second visual icon corresponding to the at least one data file of the second data result, and a third visual icon corresponding to the at least one data file of the third data result are displayed on a display device of the first computerized device, wherein the visual icon corresponding to the first, second, and third data results are displayed separately from one another (block 426). In response to a user selection of one of the first, second, or third visual icons, content of the first, second, or third data result, respectively, is displayed (block 428). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for electronic data retrieval and display with grouped context-based categorization in response to a contextless keyword query on a computerized device having a processor capable of executing computer executable instructions stored on a memory of the computerized device, the method comprising:
    initiating, by a user, a data search query on a first computerized device, the data search query consisting of a keyword entry, the keyword entry being without contextual meaning, without semantic question phrase contextual meaning, and without any associated semantical phrase;
    processing a data search in a database of a second computerized device, the data search corresponding to the keyword entry, wherein the second computerized device is in communication with the first computerized device, whereby processing the data search includes using at least one algorithm to locate within the database:
    a first data result having at least one data file relating to a 'what' context of the keyword entry; and
    a second data result having at least one data file relating to a 'why' context of the keyword entry;
    displaying, on a display device of the first computerized device, a first visual icon corresponding to the at least one data file of the first data result and a second visual icon corresponding to the at least one data file of the second data result, wherein the visual icon corresponding to the first data result is displayed separately from the visual icon corresponding to the second data result, thereby providing a user with 'what' and 'why' grouped context-based categorization of results in response to a contextless keyword entry; and
    in response to a user selection of one of the first visual icon or the second visual icon, displaying content of the first data result or the second data result, respectively.

2. The method of claim 1, further comprising:
    using the at least one algorithm to locate within the database a third data result having at least one data file relating to an additional context of the keyword entry; and
    displaying, on the display device of the first computerized device, a third visual icon corresponding to the at least one data file of the third data result, wherein the visual icon corresponding to the third data result is displayed separately from the visual icons corresponding to the first data result and the second data result.

3. The method of claim 1, further comprising compiling the first data result and the second data result in the database prior to initiating the data search query.

4. The method of claim 1, wherein the content displayed further comprises a video.

5. The method of claim 1, wherein the first and second visual icons corresponding to the at least one data file of the first data result and the second data result, respectively, further comprise a plurality of visual icons, wherein each of the plurality of icons corresponding to one of the at least one data file of the first data result and the second data result, respectively.

6. The method of claim 5, wherein the plurality of visual icons for the first or second data result further comprise sequentially categorized content corresponding to the first data result or the second data result, respectively.

7. The method of claim 1, wherein content of the first data result or the second data result has at least two authors, wherein a first portion of the content corresponding to a first author is separated from a second portion of the content corresponding to a second author.

8. A computer-implemented method for electronic data retrieval and display with grouped context-based categorization in response to a contextless keyword query on a computerized device having a processor capable of executing computer executable instructions stored on a memory of the computerized device, the method comprising:
    initiating a plurality of data search queries on a first computerized device, the plurality of data search queries each consisting of only a keyword entry, wherein the keyword entry is free from contextual meaning, free from semantic question phrase contextual meaning, and without any associated semantical phrase, wherein the keyword entry is free from a 'what,' 'why,' 'where,' 'when,' 'who,' or 'how' semantical question term;
    processing a data search in a database of a second computerized device for each of the plurality of data search queries, the data search corresponding to the keyword entry, wherein the second computerized device is in communication with the first computerized device, whereby processing the data search includes using at least one algorithm to locate within the database data results consisting of:
    a first data result having at least one data file relating to a 'what' context of the keyword entry;
    a second data result having at least one data file relating to a 'why' context of the keyword entry; and
    a third data result having at least one data file relating to an additional context of the keyword entry;
    displaying, on a display device of the first computerized device, a first visual icon corresponding to the at least one data file of the first data result, a second visual icon corresponding to the at least one data file of the second data result, and a third visual icon corresponding to the at least one data file of the third data result, wherein the visual icon corresponding to the first, second, and third data result are displayed separately from one another, thereby providing a user with at least 'what' and 'why' grouped context-based categorization of results in response to a contextless keyword entry; and
    in response to a user selection of one of the first, second, or third visual icons, displaying content of the first, second, or third data result, respectively.

9. The method of claim 8, further comprising compiling the first, second, and third data results in the database prior to initiating the data search query.

10. The method of claim 8, wherein the content displayed further comprises a video.

11. The method of claim 8, wherein the first, second, and third visual icons corresponding to the at least one data file of the first, second, and third data result, respectively, further comprise a plurality of visual icons, wherein each of the plurality of icons corresponding to one of the at least one data file of the first, second, and third data results, respectively.

12. The method of claim 11, wherein the plurality of visual icons for the first, second, or third data result further comprise sequentially categorized content corresponding to the first, second, or third data results, respectively.

13. The method of claim 8, wherein content of the first, second, or third data result has at least two authors, wherein a first portion of the content corresponding to a first author is separated from a second portion of the content corresponding to a second author.

14. A computer-implemented system for electronic data retrieval and display with grouped context-based categorization in response to a contextless keyword query on a computerized device having a processor capable of executing computer executable instructions stored on a memory of the computerized device, the system comprising:
 a first computerized device having input/output interfaces configured to receive a data search query from a user, the data search query consisting of a keyword entry, the keyword entry being without contextual meaning, without semantic question phrase contextual meaning, and without any associated semantical phrase;
 a second computerized device having a data search platform and a database, wherein a data search is processed in the database, the data search corresponding to the keyword entry, wherein the second computerized device is in communication with the first computerized device, whereby processing the data search includes using at least one algorithm to locate, within the database:
 a first data result having at least one data file relating to a 'what' context of the keyword entry; and
 a second data result having at least one data file relating to a 'why' context of the keyword entry; and
 a display device of the first computerized device, wherein a first visual icon corresponding to the at least one data file of the first data result and a second visual icon corresponding to the at least one data file of the second data result are displayed on the display device visible to the user, wherein the visual icon corresponding to the first data result is displayed separately from the visual icon corresponding to the second data result, thereby providing a user with 'what' and 'why' grouped context-based categorization of results in response to a contextless keyword entry, wherein, in response to a user selection of one of the first visual icon or the second visual icon, content of the first data result or the second data result, respectively, is displayed.

15. The system of claim 14, further comprising using the at least one algorithm to locate within the database a third data result having at least one data file relating to an additional context of the keyword entry, wherein a third visual icon corresponding to the at least one data file of the third data result is displayed on the display device of the first computerized device, wherein the visual icon corresponding to the third data result is displayed separately from the visual icons corresponding to the first data result and the second data result.

16. The system of claim 14, wherein the first data result and the second data result are compiled in the database prior to the data search query being initiated.

17. The system of claim 14, wherein the content displayed further comprises a video.

18. The system of claim 14, wherein the first and second visual icons corresponding to the at least one data file of the first data result and the second data result, respectively, further comprise a plurality of visual icons, wherein each of the plurality of icons corresponding to one of the at least one data file of the first data result and the second data result, respectively.

19. The system of claim 18, wherein the plurality of visual icons for the first or second data result further comprise sequentially categorized content corresponding to the first data result or the second data result, respectively.

20. The system of claim 14, wherein content of the first data result or the second data result has at least two authors, wherein a first portion of the content corresponding to a first author is separated from a second portion of the content corresponding to a second author.

* * * * *